(12) United States Patent
Watzl

(10) Patent No.: US 7,593,791 B2
(45) Date of Patent: Sep. 22, 2009

(54) METHOD AND DEVICE FOR ADAPTATION OF FUNCTIONS FOR CONTROLLING OPERATING SEQUENCES

(75) Inventor: Martin Watzl, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 465 days.

(21) Appl. No.: 10/578,342

(22) PCT Filed: Nov. 4, 2004

(86) PCT No.: PCT/DE2004/002447

§ 371 (c)(1),
(2), (4) Date: May 5, 2006

(87) PCT Pub. No.: WO2005/045537

PCT Pub. Date: May 19, 2005

(65) Prior Publication Data

US 2007/0033583 A1 Feb. 8, 2007

(30) Foreign Application Priority Data

Nov. 5, 2003 (DE) .............................. 103 52 172

(51) Int. Cl.
*G06F 1/00* (2006.01)
(52) U.S. Cl. ......................................................... 701/1
(58) Field of Classification Search ...................... 701/1; 713/100; 711/200; 718/100
See application file for complete search history.

(56) References Cited

U.S. PATENT DOCUMENTS

| 4,530,052 A | * | 7/1985 | King et al. ................... 713/100 |
| 4,866,665 A | | 9/1989 | Haswell-Smith et al. |
| 5,109,504 A | | 4/1992 | Littleton et al. |
| 5,371,858 A | * | 12/1994 | Miller et al. ................. 709/222 |
| 6,543,049 B1 | | 4/2003 | Bates |

FOREIGN PATENT DOCUMENTS

| DE | 101 06 504 | 8/2002 |
| DE | 102 28 610 | 1/2003 |
| RU | 2177636 | 12/2001 |

* cited by examiner

*Primary Examiner*—Yonel Beaulieu
(74) *Attorney, Agent, or Firm*—Kenyon & Kenyon LLP

(57) ABSTRACT

A method and a device for adaptation of functions for controlling operating sequences, the functions accessing at least one global variable of at least one program for control and this global variable being assigned address information which is located in at least one memory device, this address information of the global variables being loaded by at least one load instruction out of the memory device, wherein the address information of the global variable of the load instruction is replaced.

19 Claims, 11 Drawing Sheets

601. Control unit program code
602. Control unit function
604. Store instruction is replaced by a function
618. Address of the control unit variable
620. Software balcony function call
621. Software balcony function having breakpoint
619. Address of the control unit variable
622. Jump back to control unit function 603. ☐ New program code

METHOD AND DEVICE FOR ADAPTATION OF FUNCTIONS FOR CONTROLLING OPERATING SEQUENCES

FIELD OF THE INVENTION

The present invention is directed to a method and device for adaptation of functions for controlling operating sequences, in particular in a motor vehicle. The present invention is also directed to a corresponding control unit and a corresponding computer for function development and the associated computer program as well as the corresponding computer program product.

BACKGROUND INFORMATION

In function development of control unit software, in particular in automotive control units for controlling the engine, brakes, transmission, etc., the bypass application is a rapid prototyping method for developing and testing new control unit functions. However, such development of functions is also possible with all other control unit applications, e.g., in the field of automation and machine tools.

Two applications of external control unit bypass, as described in German Patent Application No. DE 101 06 504 A1, for example, and of internal control unit bypass, as described in German Patent Application No. DE 102 286 10 A1, for example, may be used as development methods here.

German Patent Application No. DE 101 06 504 A1 describes a method and an emulation device for emulating control functions and/or regulating functions of a control unit or regulating unit of a motor vehicle in particular. For emulation, the functions are transferred to an external emulation computer, a data link being established via a software interface of the emulation computer and a software interface of the control unit/regulating unit before the start of emulation. To greatly accelerate the development and programming of new control/regulating functions of the control unit/regulating unit, the software interfaces configured for emulation of different control/regulating functions before the start of emulation without any change in software.

German Patent Application No. DE 102 286 10 A1 describes a method and a device for testing a control program by using at least one bypass function in which the control program is executed together with the at least one bypass function on an electric computing unit. The bypass functions are coupled to preselected interfaces via dynamic links.

Independently of these two methods and devices, interventions in the control unit software are necessary for applicability. Such interventions are referred to with the term bypass breakpoint or software breakpoint. A bypass breakpoint, i.e., software breakpoint, describes exactly the location in a software function where the content of a control unit variable is not described by the software program but instead is described via detours, e.g., via a bypass software function. Software breakpoints are highly individual and in the normal case are not part of a control unit software program because memory resources are used for this.

If a function developer requires a control unit program having software breakpoints, these are incorporated into a program version only after the development department has been commissioned. For this purpose, the software development manually modifies the source code of the corresponding function and, by running a compiler and link, creates a new control unit program which is used explicitly for the prototyping application.

A disadvantage of the conventional method and device includes the long running time until availability of the rapid prototyping program version. An important factor here is the high technical and administrative cost for the specification and implementation of the software interventions.

According to the information currently available, a comparable method is based on the idea of replacing only the store instructions (write access to a control unit variable) via jump instructions to a subfunction. However, in microcontrollers having a mixed instruction set (16/32-bit CPU instructions), the store instructions may already be 16 bits because addressing is performed indirectly via address registers. These 16-bit instructions cannot be used to call a subfunction because a direct address-oriented call of a subfunction requires a 32-bit jump instruction. Therefore, the conventional method is usable only to a limited extent and may be used only with microprocessors having a pure 32-bit instruction set. In other words, when the store instruction has a fixed bit width, flexibility with regard to the function development is greatly restricted here. This is also true when a certain store instruction must not be manipulated at all for other reasons, so that populating in this way via a jump instruction to a subfunction is then not possible at all.

SUMMARY

An object of the present invention is to introduce software breakpoints without source code changes into an existing software program and to overcome the aforementioned problems of the related art.

The present invention relates to a method and a device for adaptation of functions for controlling operating sequences, preferably in motor vehicles, where the functions access at least one global variable of at least one program for control and this global variable is assigned address information which is present in at least one memory device, this address information of the global variables being loaded out of the memory device by at least one load instruction and this address information of the global variable of the load instruction being advantageously replaced.

An initial address of the function is advantageously determined from the address information, the function then being expandable or replaceable by additional functions so that the functions for controlling operating sequences are replaced and/or expanded by replacing the address information with additional functions.

The present invention expediently uses "dynamic hooks" of software breakpoints without any changes in source code. The method described and the corresponding device for accomplishing this modify the address information of load instructions, modify the function calls and insert new program codes. These modifications are performed on an existing software program version, e.g., on the basis of specific HEX code modifications.

It is also advantageous that the address information of the global variable is replaced by the address information of a pointer variable, the address information of the pointer variable being in a reserved memory area, in particular of the memory device in the control unit.

In addition to the modification with respect to the load instructions, in one embodiment a store instruction is advantageously manipulated onto the global variable by replacing the store instruction with a jump instruction. The functions for controlling the operating sequences are expediently replaced and/or expanded by replacing the store instruction with the jump instruction through additional functions.

The present invention further includes a control unit containing such a device, and along with a computer program suitable for execution of such a method. This computer program is executed on a computer, in particular an application control unit system according to the present invention or an application PC. The computer program according to the present invention may be stored on any machine-readable medium. Such a computer-readable data medium or machine-readable medium may be in particular a diskette, a CD-ROM, a DVD, a memory stick or any other portable memory medium. Likewise, memory media such as ROM, PROM, EPROM, EEPROM or flash memories and volatile RAM memories, etc., are also possible for storage. The choice of the memory medium, i.e., the machine-readable medium, is thus not to be regarded as restrictive with respect to the computer program product as the object of the present invention.

Using the present invention, the various rapid prototyping methods, software test methods and data calibration methods are rendered more rapidly usable and more flexible in handling.

Thus, the software breakpoints are implemented without tying up software development capacity. This results in a lower technical and administrative complexity on the whole and therefore reduces costs.

At the same time, microprocessor types having a mixed set of 16/32-bit CPU instructions, for example, may be supported.

BRIEF DESCRIPTION OF THE DRAWINGS

The present invention is explained in greater detail below on the basis of the figures.

DETAILED DESCRIPTION OF EXAMPLE EMBODIMENTS

Figure 1:
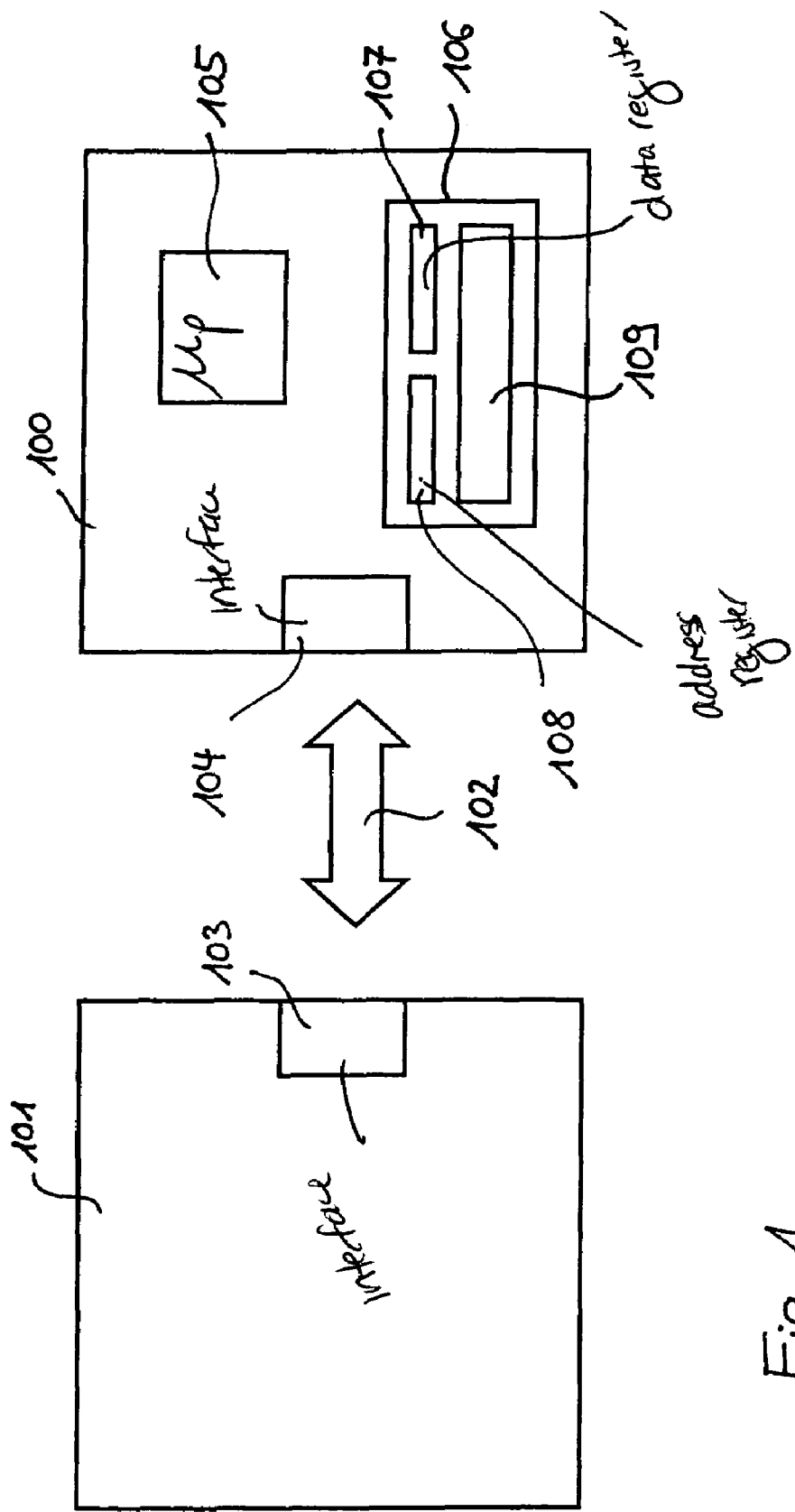
FIG. 1 shows a system or a device according to an example embodiment of the present invention for adapting the functions.

FIG. 1 shows a schematic diagram of an application arrangement having a control unit 100 and an application system 101, which are connected to interfaces 103 and 104 via a link 102. This link 102 may be designed to be wired or wireless. A microprocessor 105 is shown in particular having a mixed instruction set. Memory device 106 includes an address register 108, a data register 107 and a memory area for the at least one program to be adapted with regard to functions. The control device for implementing the present invention may be contained in the application system and/or represented by it or designed using the microprocessor itself. Likewise, a memory device for implementation of the present invention may also be situated outside the control unit, in particular in the application system. The present invention is implementable using the device shown here.

Although the functions may be adapted using an external bypass, the advantageous embodiment is to perform the adaptations internally in such a way that they are tied into the program run and therefore there are dynamic hooks for software interventions without any source code changes.

In accordance with an example embodiment, the address information of load instructions is modified, the content of store instructions is modified, the address information of function is modified and new program codes are added. These changes are implemented here in the exemplary embodiment on an existing software program version on the basis of targeted hex code modifications.

The various components with regard to the object "dynamic software breakpoint" according to the present invention being explained below are:

Determination of the program points
Modification of the program points including modification of the load/store instructions and modification of the function calls
Creation of additional program code
Tying in the software breakpoint code
Segmenting the memory areas and
Development process for creation of the program code.

The method described below is based on the use of microcontrollers having a mixed instruction set, in particular 16/32-bit CPU instructions. For example, the TriCore TC17xx microcontroller (RISC/DSP/CPU) from Infineon is the example used here; it is a component of a control unit for controlling operating sequences, in particular in a motor vehicle, e.g., for engine control or for controlling the steering, transmission, brakes, etc.

However, this method may also be used with microprocessors having a non-mixed instruction set, in particular in pure 32-bit microprocessors (RISC processors, e.g., PowerPC/MPC5xx).

In this method, it is assumed that the code generator of the compiler arranges the machine instructions sequentially. This is understood to refer to the sequential arrangement of instructions for loading address information of an indirectly addressed control unit variable, for example, into the corresponding address registers. In contrast, in the case of a directly addressed variable, the address information is in the instruction itself. This is the case with most compilers.

Figure 2:
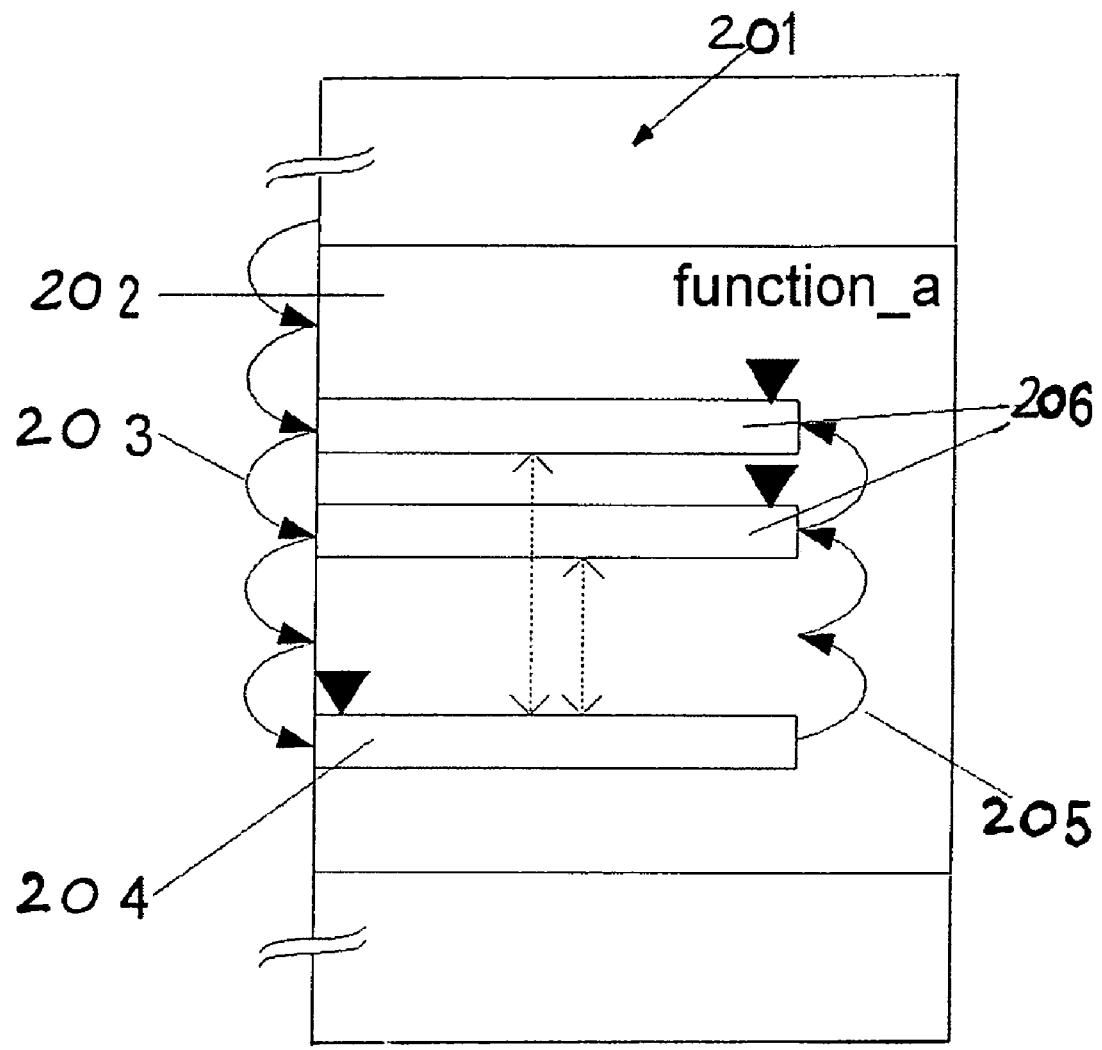
FIG. 2 shows the sequence for determining the breakpoints or the software breakpoints in the program.

Determination of the Program Points (FIG. 2)

The starting point for this is a control unit software program which is available in the form of a hex code file, for example. Additional files may include a data description file (e.g., ASAP) and a linker file (e.g., ELF binary) which supply information about control unit variables and control unit functions.

Using a disassembler software program (e.g., a Windows software program), the hex code file is disassembled. The corresponding addresses of the control unit variables to be bypassed are taken from the data description file or from a reference databank created for the method.

The disassembler program created according to the present invention, e.g., a Windows software program, seeks the corresponding access instructions to the control unit variables (load/store instructions) in the disassembled program code with the assistance of the address information of these variables being sought, which affect the content of variables.

This disassembler program as a Windows software program is a simulation program which checks the register contents after each assembler instruction. If a store instruction is localized and the content of the loaded address register corresponds to the address value of the control unit being sought or if the memory destination of the store instruction corresponds to the variable address, then this is a source where the content of the control unit variables is modified.

The manner in which the program code is modified at the source depends on the particular type of addressing of the control unit variables.

This is depicted in FIG. 2, which shows control unit program code 201 and software function 202. Arrows 203 symbolize the method described here for determining the store instructions. Store instruction 204 of a variable access is shown in such a way that in the case of direct addressing, the memory destination of the store instruction is the RAM address, and in the case of indirect addressing, the content of the address register corresponds to the RAM address, so the load instructions may then be determined. Arrows 205 represent the method described here for determining the load instructions. Load instructions 206 are for loading the variable addresses, specifically the global variables.

Modification of the Program Points (FIGS. 3 through 8)

First, the load instruction sources and/or the store instruction sources are localized according to different types of addressing and then the control unit function in which the sources are located is determined for these sources, so that all the function calls in the entire program code may be accomplished through function calls of the newly created hook function(s), so that the original function call of the control unit function may take place within the corresponding hook function.

Modification of the Load/Store Instructions

With the microcontroller(s) described here, there are a number of different types of addressing in a wide variety of embodiments. It is possible to minimize this variety.

Four methods which largely cover possible combinations of a write access to global variables are presented below. Other methods of code analysis are possible such as a relative addressing via previously occupied address registers.

Figure 3:
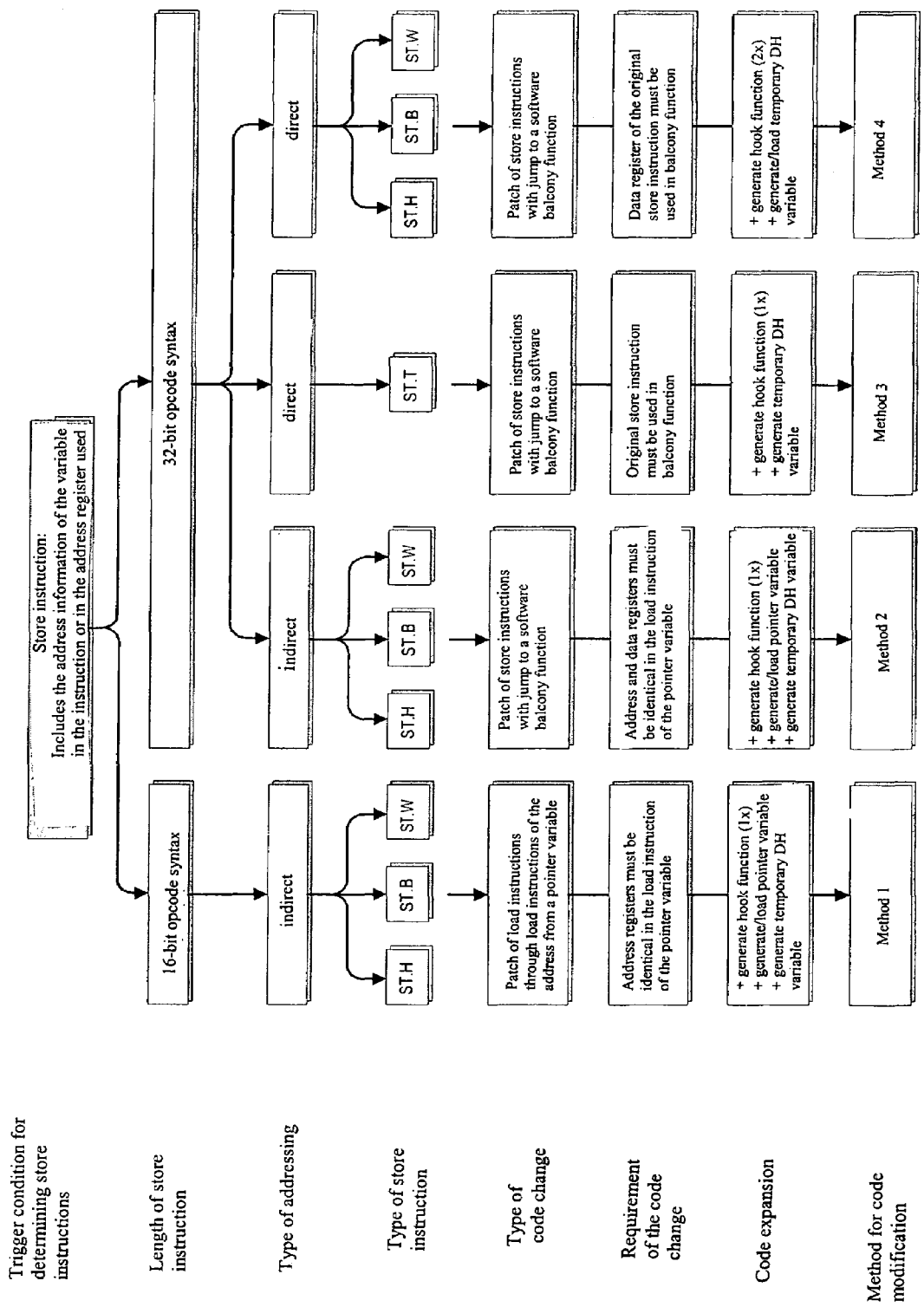
FIG. 3 shows an overview and selection of various methods for modification of the load instructions and/or the store instructions.

To do so, FIG. 3 shows an overview of the different methods for modification of the load and/or store instructions. Store instructions st.x here mean: st.b=store byte, st.h=store half word and st.w=store word. The four methods illustrated in FIG. 3 are explained in greater detail below.

Figure 4:
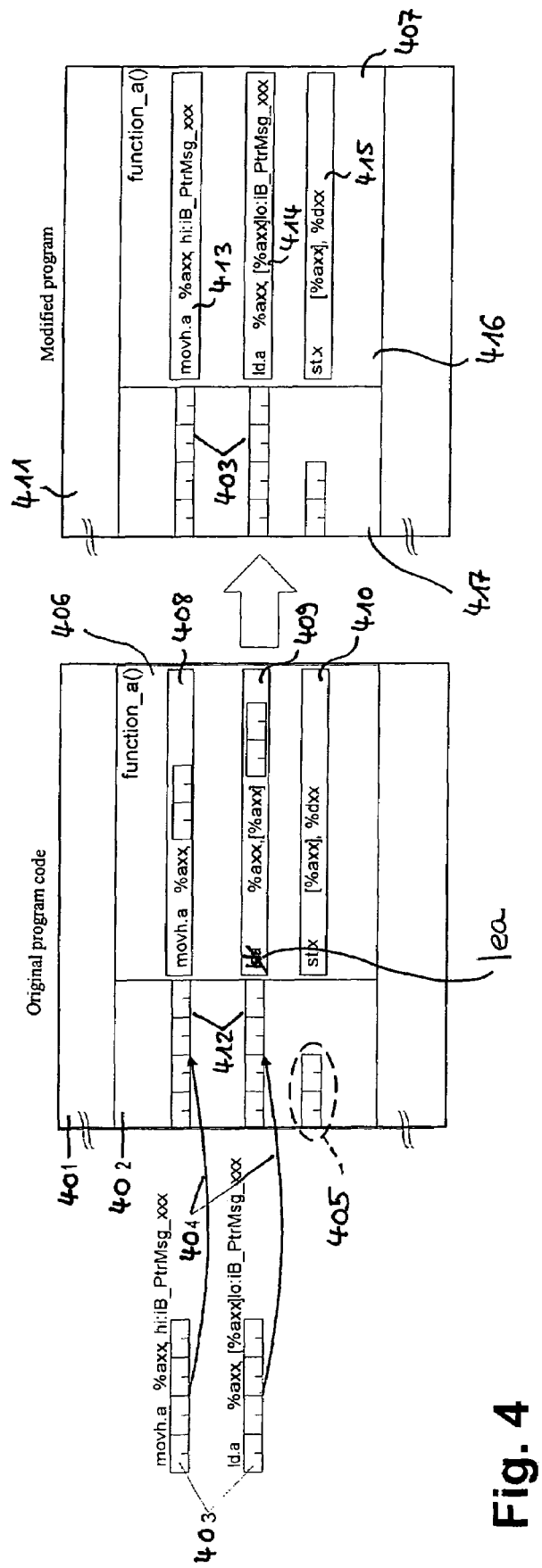
FIG. 4 shows a program diagram for a first and preferred modification method of the load instruction.

Modification of the program points according to method 1 is illustrated in greater detail in FIG. 4. Method 1 involves, for example, a 16-bit store instruction and indirect addressing. Starting from the position of the found store instruction, the points are traced back in the disassembled program code until the particular load instructions are determined. The found load instructions are the deciding factor for this method. This method is used not only in problems with a mixed instruction set but also when, for other reasons, it is impossible to replace the store instruction with a jump instruction.

In method 1 the determined load instructions, based on the subsequent store instruction, are replaced by address information of a pointer variable. This pointer variable is generated via a development environment, in particular the DHooks development environment. The address of the pointer variable is in a reserved free area of the memory means, the memory layout for variables. The modified load instructions address the same address register as the original instructions. The difference in the modified load instructions is in the type of addressing of the address register and the address information.

FIG. 4 illustrates method 1 in a schematic diagram showing original program code 401 and modified program code 411. The control unit function, function_a( ) here, is formed by 402, 406 and 417, 407. The instructions, i.e., instruction sequences, are shown in 402 and 417, respectively, and the actual functionality is shown in 406 and 407. This shows access axx % to an address register (e.g., a0 through a15 in the case of a 16-bit width) and access dxx % to a data register (e.g., d0 through d15 in the case of a 16-bit width). Let us now consider instructions movh.a and ld.a (load instructions) and st.x (store instruction) in 408, 409, 410, 413, 414 and 415. In this example, movh.a, ld.a and lea are shown as 32-bit instructions (see 412 and 403). Store instruction st.x is shown as a 16-bit instruction (see 405) and therefore is not replaceable with a 32-bit jump instruction in this example. As stated previously, this also applies to all other cases in which such a replacement is impossible or undesirable. The novel instruction code according to the present invention, i.e., program code 403, is now input into 412 and the load instructions are modified to pointer variable iB_PtrMsg_xxx (Ptr=pointer). The address of the control unit variable is replaced by the address of the pointer variable according to 404. The method for creating additional program code, i.e., additional functions, is explained in greater detail below according to the four methods.

Figure 5:
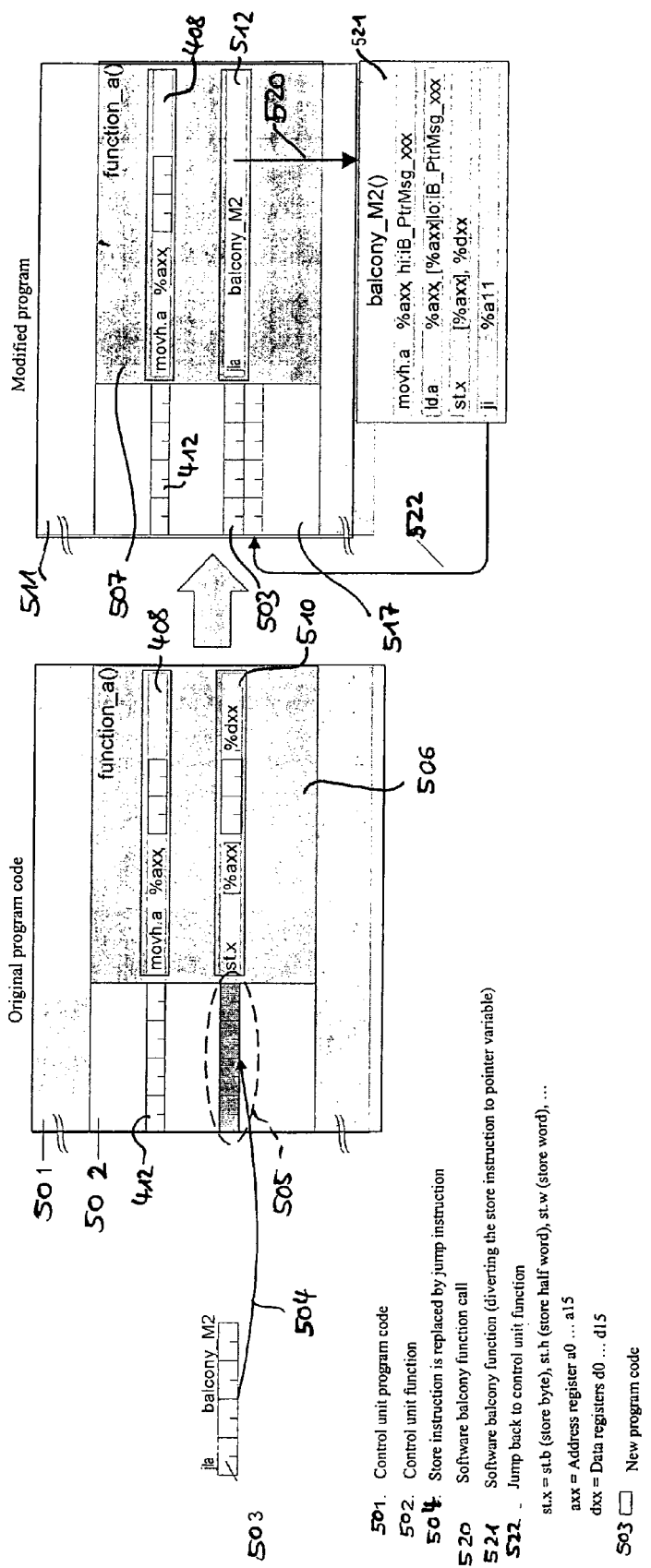
FIG. 5 shows a program diagram for a second modification method of the store instruction.

FIG. 5 shows in greater detail the modification of the program points according to method 2. The same notations and abbreviations as used in method 1 are also applicable here as well as in all other method examples. Original program code 501 and modified program code 511 are shown. The control unit function, function_a( ) here, is formed by 502, 506 and 517, 507. Instructions and/or instruction sequences are shown in 502 and 517, and the actual functionality is shown in 506 and 507. Access % axx to an address register (e.g., a0 through a15 in the case of a 16-bit width) and access % dxx to a data register (e.g., d0 through d15 in the case of a 16-bit width) are shown. Let us now consider instructions movh.a and ld.a (load instructions) and st.x (store instruction). Store instruction st.x is now shown as a 32-bit instruction (see 505) and is thus replaceable in this example by a 32-bit jump instruction jla. The novel instruction code according to the present invention, i.e., program code 503 (jla: jump instruction), is now input into 505.

Method 2 uses a 32-bit store instruction in conjunction with indirect addressing. The 32-bit store instruction is replaced by an absolute jump instruction jla 512 to a software balcony function (balcony_M2) (see call 520 of the software balcony function). With the jla jump instruction, the jump back address is stored in register a11 (see 521).

In software balcony function 521 mentioned above, the content of address register % axx by which the control unit variable is addressed, is replaced by the address value of a pointer variable (iB_PtrMsg_xxx). The index of address register % axx and of the previously loaded data register % dxx are identical in software balcony function 521.

When 32-bit store instructions are used for the software breakpoint, additional program code is required. This program code, generated in the DHooks development environment, is referred to as a balcony function. The balcony functions include additional initializing, copying and breakpoint mechanisms and are used as software functions to expand the breakpoint functionality. Balcony functions are used for breakpoint methods 2, 3 and 4.

Due to jump instruction jla, the content of data register % dxx which is used remains unchanged. Addressing is then performed via the pointer in the software balcony function and thus the store instruction is diverted to the pointer variable. Store instruction st.x writes data as in the original code.

The sequence then jumps back into control unit function according to 522 via the jump back address stored in address register all via an indirect jump.

Figure 6:
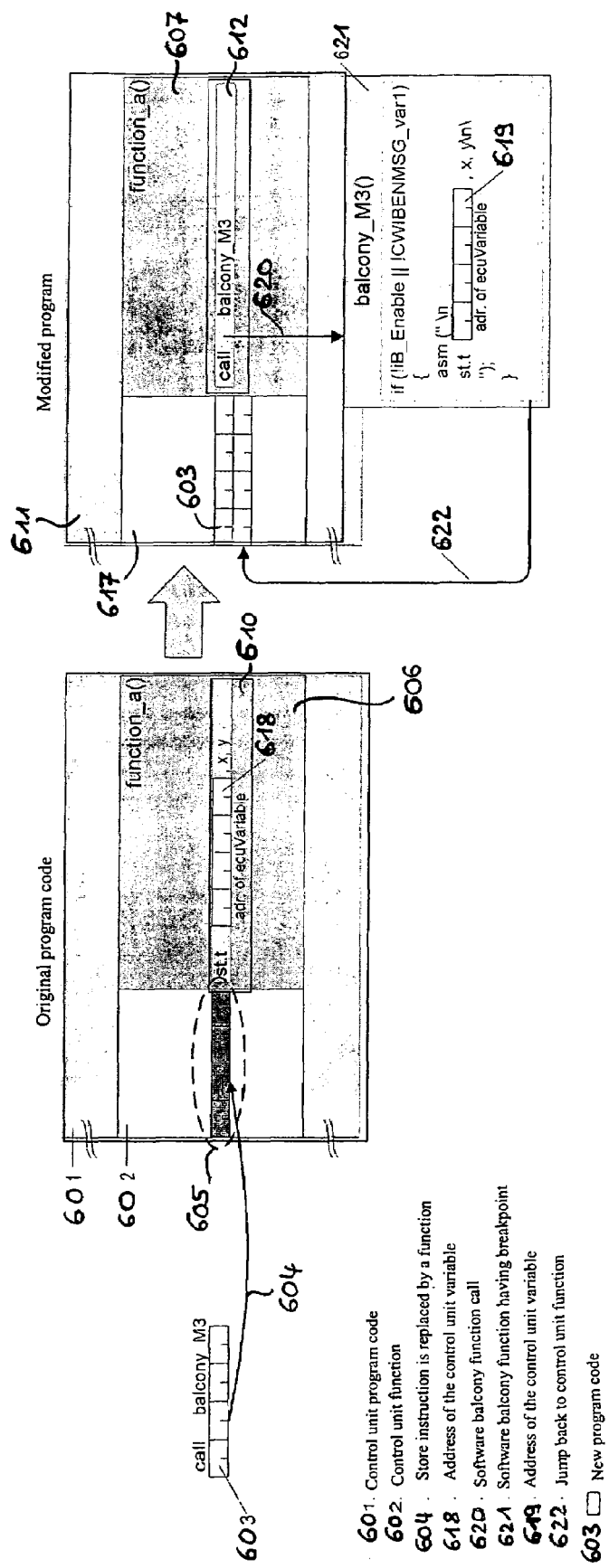
FIG. 6 shows a program diagram for a third modification method of the store instruction.

FIG. 6 shows in greater detail the modification of the program points according to method 3. The same notations and abbreviations are specifically used here as for method 2 and for all other method examples. Original program code 601 and modified program code 611 are shown. The control unit function, function_a( ) here, is formed by 602, 607 and 617, 607. The instructions, i.e., instruction sequences, are shown in 602 and 617, respectively, and the actual functionality is shown in 606 and 607. A special st.x (store instruction), namely st.t, is considered. Store instruction st.t is now shown as a 32-bit instruction (see 605) and thus is replaceable in this example by a 32-bit function call (call balcony_M3). The instruction code according to the present invention, i.e., program code 603 (call: function call), is now input into 605.

In method 3 a 32-bit store instruction st.t is used in combination with direct addressing 618 (store instruction having address 610). The 32-bit store instruction is replaced by a 32-bit function call (call balcony_M3, 603) of a software balcony function (balcony_M3, 621) (see 604). Software balcony function 621 includes the query of a breakpoint and the store instruction in the original state. When a breakpoint is activated, no store instruction is executed. This variable is thus uncoupled from the control unit function. To do so, call 620 for balcony function 621 from 612 is carried out. Jump back 622 to the control unit function takes place via the address of the control unit variable (adr. of ecu variable) 619.

Figure 7:
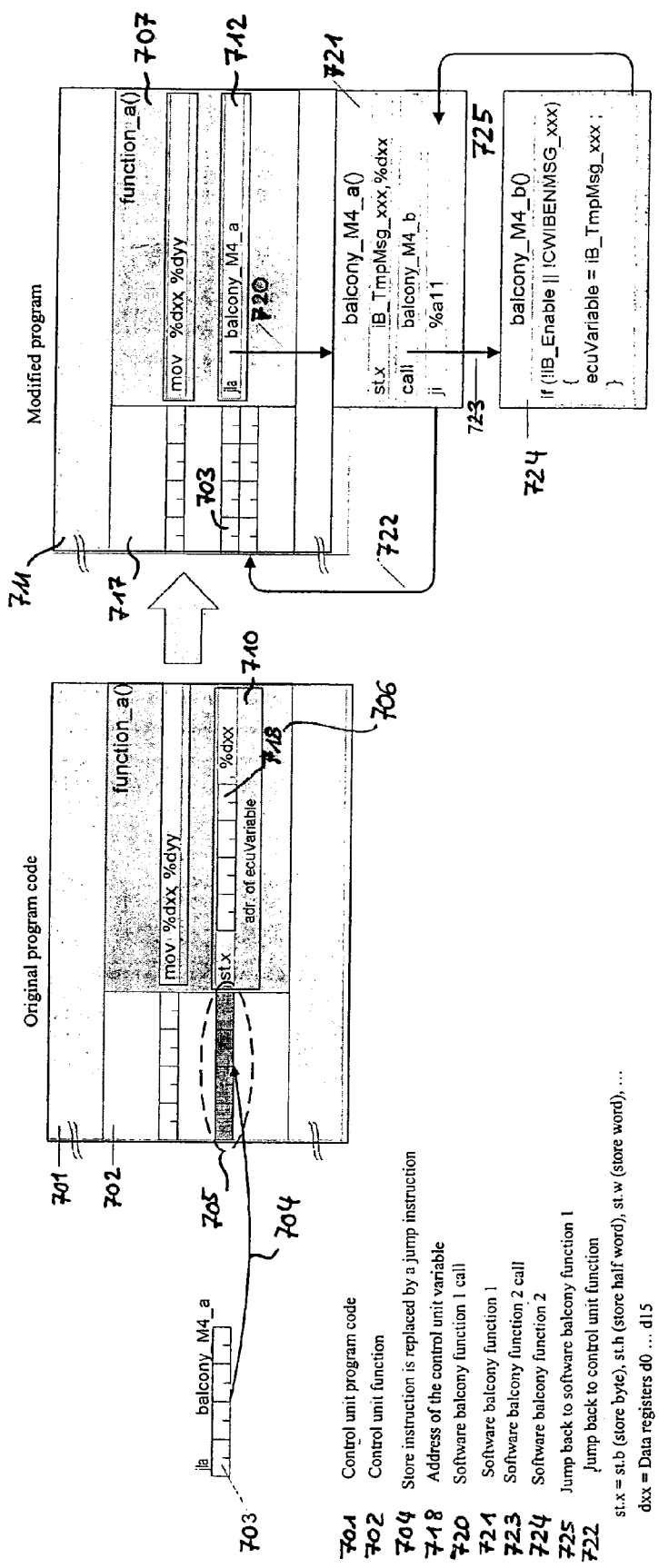
FIG. 7 shows a program diagram for a fourth modification method of the store instruction.

FIG. 7 shows the modification of the program points according to method 4 in more detail. As is the case with all other method examples, the same reference notations and abbreviations are used here, specifically the same as those used for method 2. Original program code 701 and modified program code 711 are shown. The control unit function, function_a( ) here, is formed by 702, 706 and 717, 707. The instructions, i.e., instruction sequences, are shown in 702 and 717, respectively, and the actual functionality is shown in 706 and 707. Access % axx to an address register and access % dxx and/or % dyy to a data register are shown. Instructions mov, st.x (store instruction) call and jla shall now be considered as described above in the methods. Store instruction st.x is shown as a 32-bit instruction (see 705) and is thus replaceable in this example by a 32-bit jump instruction. The novel instruction code according to the present invention, i.e., program code 703 (jla: jump instruction), is now input into 705.

Method 4 uses a 32-bit store instruction st.x (710) in combination with direct addressing (718). The 32-bit store instruction is replaced by a 32-bit jump instruction jla (jla balcony_M4_a). The jump instruction points to software balcony function 1 (balcony_M4_a( ), 721) which is called with 720. In software balcony function 1 721, the content of the previously loaded data register % dxx is stored temporarily in a temporary DHook variable (iB_TmpMsg_xxx). Another balcony function (balcony_M4_b( ), 724) is called from 721 with 723 via a function "call." This second software balcony function 2 contains the actual breakpoint as in method 3. Software balcony function 724 contains the query of the breakpoint. When the breakpoint is deactivated, the content of temporary variable iB_TmpMsg_xxx is written back into the control unit variable (see 725). When the breakpoint is active, there is no rewriting. The control unit variable is thus uncoupled from the control unit function. The jump back to the control unit function then takes place via 722.

Figure 8:
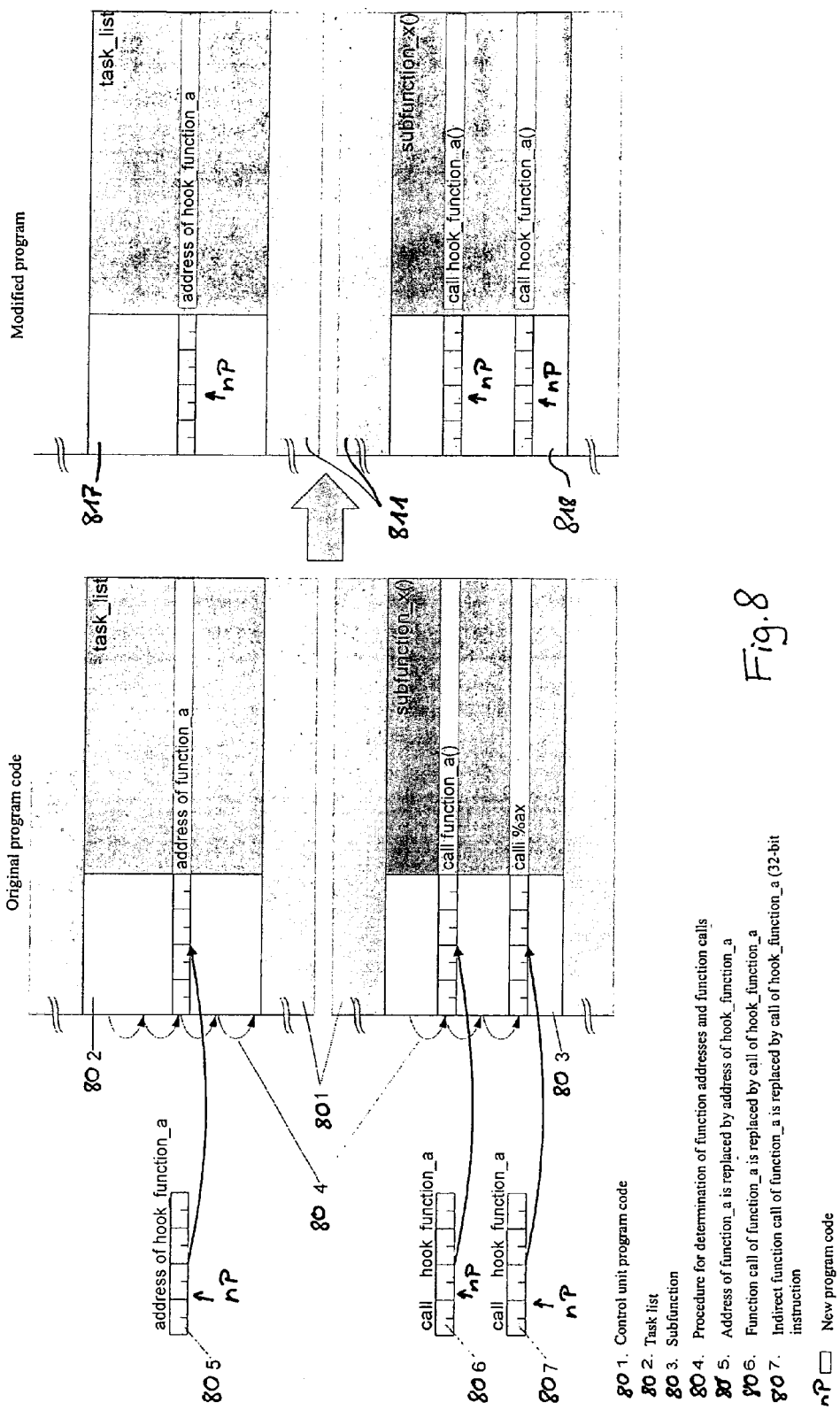
FIG. 8 shows a schematic diagram for adapting the calls of the functions for controlling the operating sequences.

Modification of Function Calls (FIG. 8)

For the localized load/store sources, the control unit function in which the sources are located is determined. This is done using the Windows software program developed for this method; on the basis of the position of the load/store instructions and with the help of reference information, it determines the corresponding beginning and end addresses of the control unit function.

Next, all function calls of the control unit function in the entire program code are replaced by function calls of the newly created hook function.

The original function call of the control unit function is performed within the corresponding hook function.

For reasons of simplicity, FIG. 8 uses the same diagram as that in the previous FIGS. 2, 4, 5, 6 and 7 to make this illustration of the modification comparable. Original control unit program code 801 and modified program code 811 are shown. A task list task_list is used and a corresponding extra function or subfunction subfunction_x( ) is used. For the sake of simplicity, there is no longer an explicit differentiation between instruction sequence and actual functionality (see FIGS. 3 through 7). The procedure 804 according to FIG. 2 is used to determine the function addresses and function calls. According to 805, the address of function_a is replaced by the address of hook_function_a. Accordingly, at 806 the function call of function_a is replaced by the call of hook_function_a. Finally, in 807, the indirect function call of function_a is replaced by a call of hook_function_a (as a 32-bit instruction here). The newly formed program code with the replacements is indicated by nP.

Figure 9:
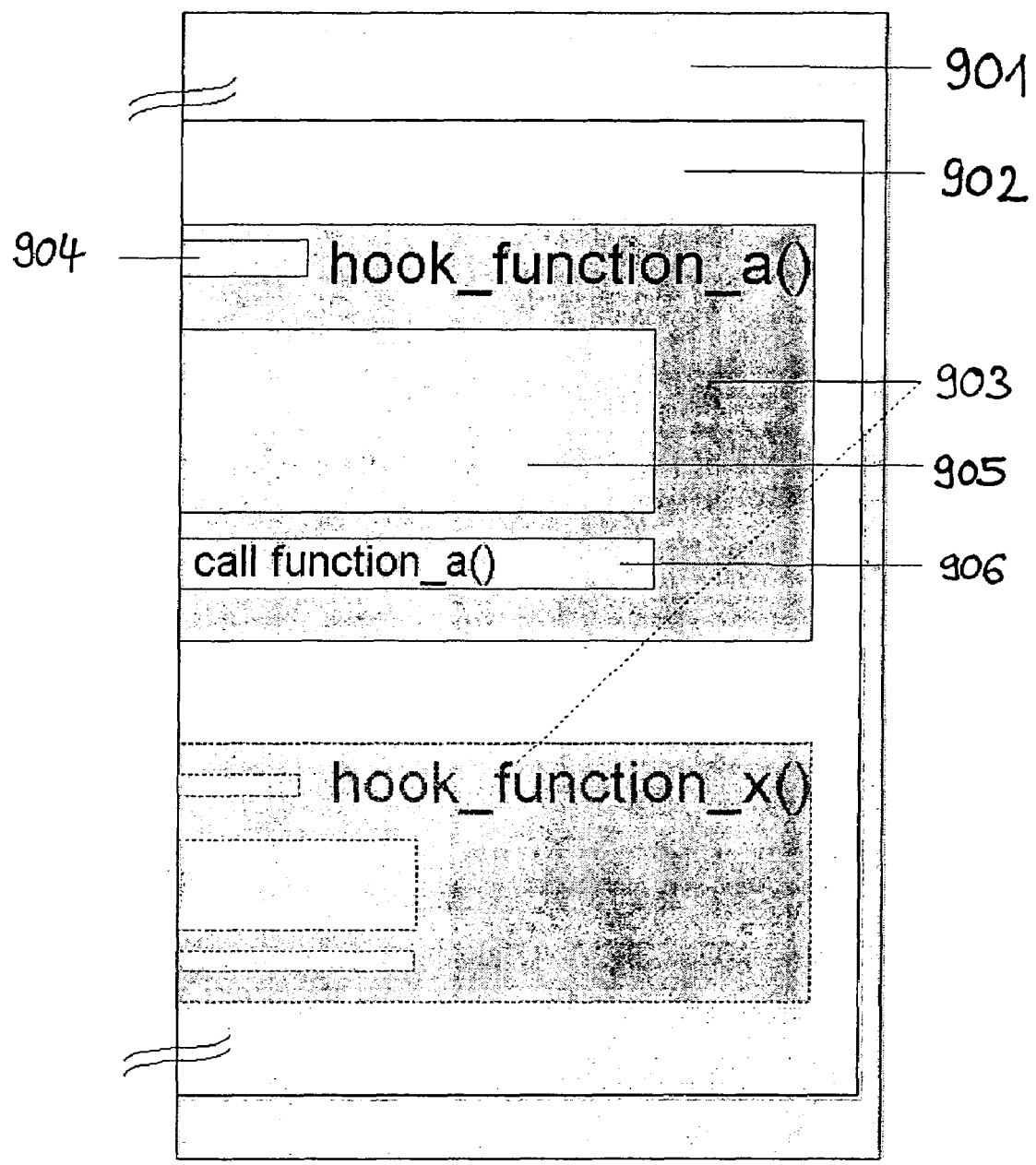
FIG. 9 shows the hook function for tying in the additional functions.

Method for Creating Additional Program Code (FIG. 9)

For each control unit function in which there is a breakpoint, a hook function may thus be created and/or is created. FIG. 9 shows a schematic diagram of such hook functions, hook_function_a( ) and hook_function_x( ). Control unit program code 901 and memory area 902 for additional program code are shown. Actual hook functions 903 and possible initialization 904 of any pointer variable needed are also shown. Program code 905 is for the software breakpoints, the configuration and tie-in of the rapid prototyping methods in particular. Finally, call 906 of original control unit function function_a( ) is shown. This is comparable for second hook function hook_function_x( ) but is not shown again for reasons of simplicity.

The hook function thus includes the breakpoint mechanism which controls access to a rapid prototyping method via application data. In addition, initialization of pointer variables and function call of the actual control unit function are performed in the hook function if necessary.

Features of the hook functions are described below as a function of the breakpoint methods.

Re breakpoint methods 1 and 2:

Before a store instruction to a control unit variable addressed by a pointer may be described appropriately, the pointer variable must be addressed using a variable address. The pointer is initialized in the hook function. If the breakpoint access is not active, the pointer is initialized using the address of the control unit variable. If the breakpoint access is active, the pointer is initialized using the address of a temporary DHooks variable. At this point, write access is diverted to the temporary variable, e.g., in the case of indirect addressing of the control unit variable.

Re breakpoint methods 3 and 4:

These two methods involve direct addressing of a control unit variable. No pointers which must be initialized are used here. The hook function includes the mechanism for controlling the software breakpoint and the function call of the original control unit function.

At this point, the balcony function when replaced by a jump instruction as already explained above should be mentioned briefly. This use was explained above in detail. If 32-bit store instructions are used for the software breakpoint, then additional program code is required for this purpose. This program code is generated in the DHooks development environment and is referred to as a balcony function. Balcony functions include additional initialization, copying and breakpoint mechanisms and are used as software functions to expand the breakpoint functionality. Balcony functions are used for breakpoint methods 2, 3 and 4.

Method for Tying in the Software Breakpoint Code

The software breakpoint code is tied in by a hex code merge run, for example. In this action, the results (hex codes) of the development environment for the dynamic breakpoint method are copied into the free areas of the original software program (hex code). The method has a structure similar to that of the internal control unit bypass in which hex code information from two separate software development runs is linked together.

Figure 10:
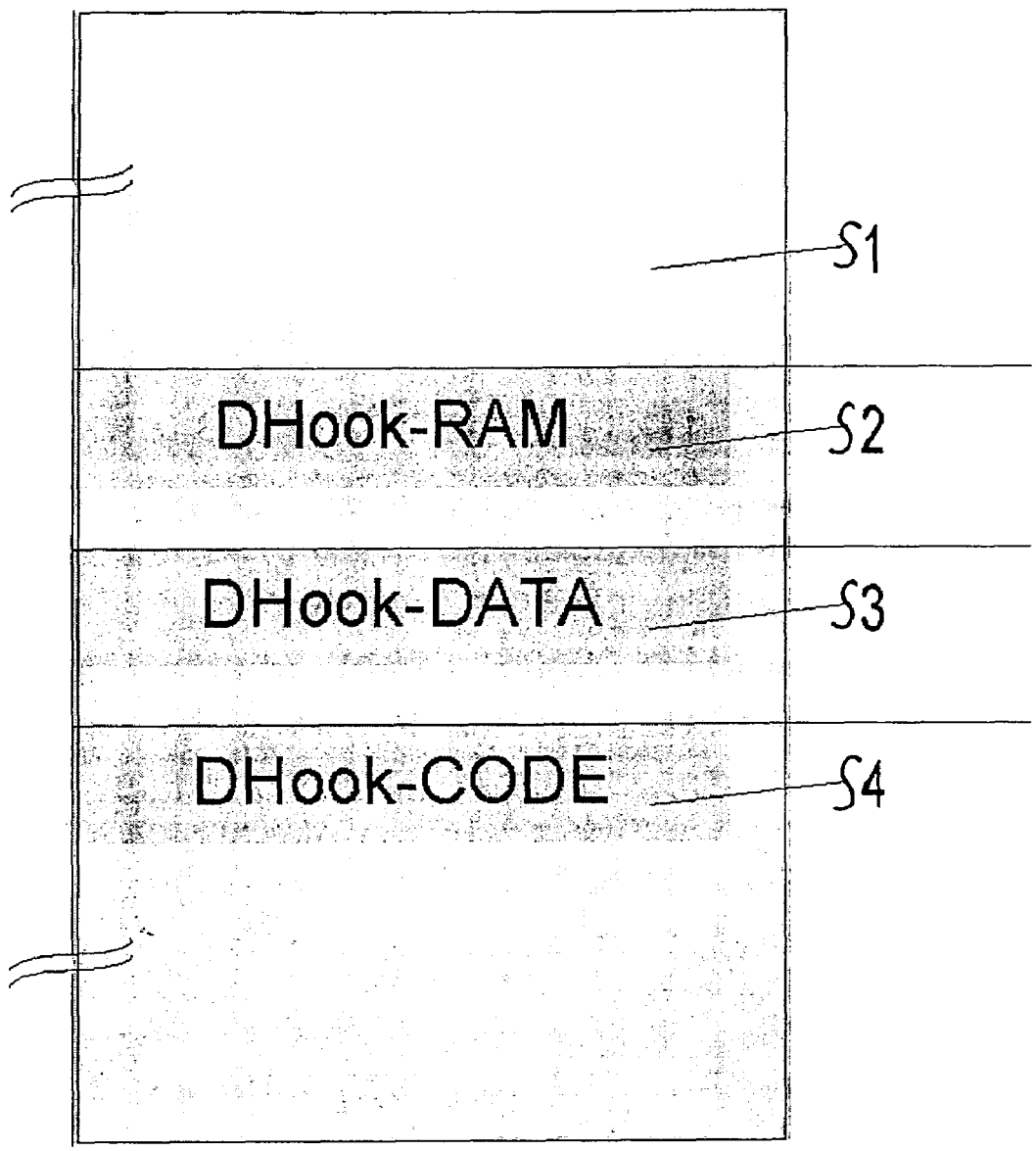
FIG. 10 shows a schematic diagram of the memory segments in the memory means with reference to the hook function.

Segmenting the Memory Areas (FIG. 10)

Dedicated memory areas of the memory means in memory layout S1 of the control unit software program are needed for the breakpoint method. According to FIG. 10, the method uses free areas for code (DHook code) S4, data (DHook data) S3, and RAM (DHook-RAM) S2.

The breakpoint functions (additional program codes) are stored in the code area, and application variables by which the breakpoint mechanism is controlled are stored in the data area. The pointer variables and administrative RAM variables needed for the method are stored in the free area for RAM variables.

Figure 11:
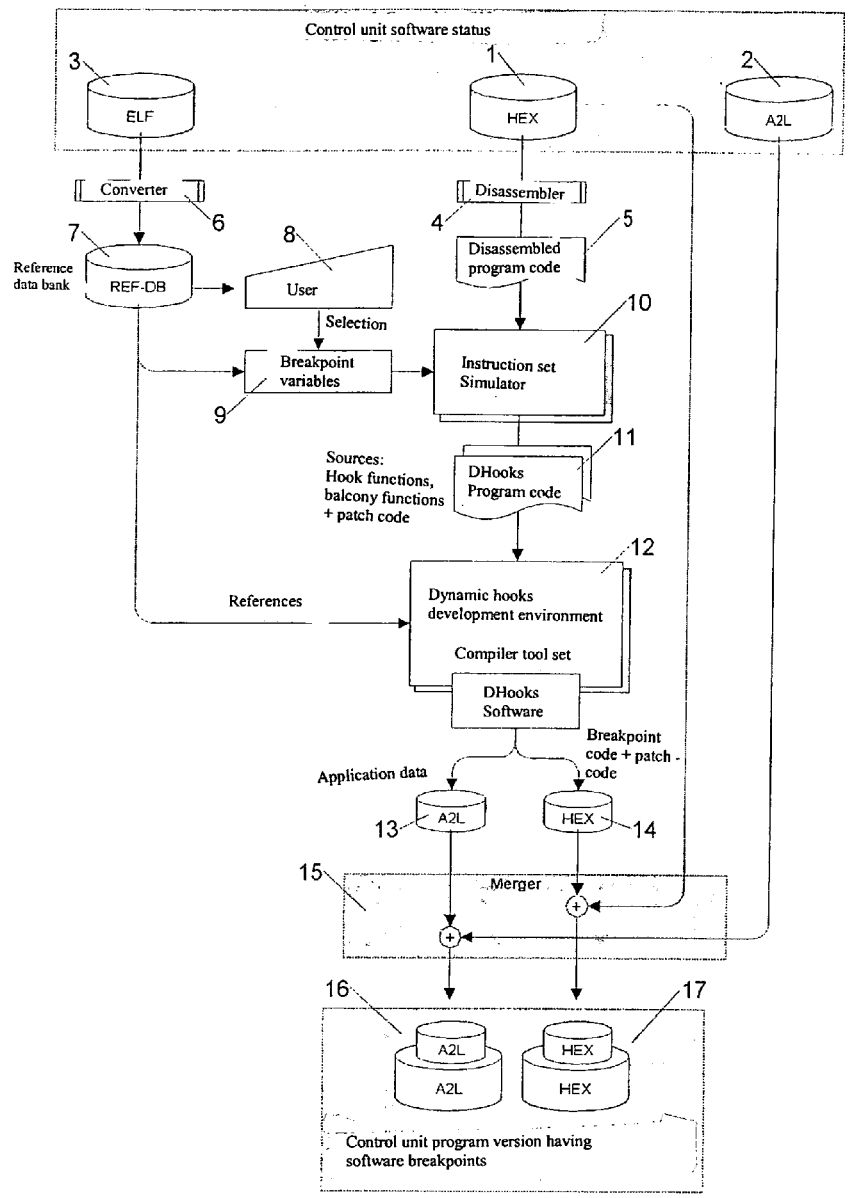
FIG. 11 shows in greater detail a complete development process according to the present invention.

Development Process for Creating the Program Code (FIG. 11)

The software breakpoint code is generated automatically via a development environment created for the method and is illustrated again in FIG. 11. The variables in point 8 may also be selected automatically according to specifiable criteria.

1. Hex code file (includes the machine code, e.g., in Intel hex or Motorola S19 format)
2. Application data description file (includes, for example, addresses and conversion formulas for variables and parameters)
3. ELF binary file (linker output file having addresses of functions and variables)
4. Program for converting machine code into readable assembler instructions
5. Disassembled program code (used as input for the simulator)
6. Converter for providing program information
7. Reference databank (used to resolve open references)
8. User creates selection of variables for breakpoints
9. Information about control unit variables to be bypassed
10. Program code simulator (reads all opcodes sequentially and checks the register contents)
11. Automatically generated source code (includes the program code for the software breakpoints, additional functions and information about the program code points to be modified)
12. Software development environment (controls all procedures for generating hex code and the application data)
13. Application data for controlling the breakpoints
14. Program code+breakpoint code+patch code
15. Hex/A21 merge procedure (dynamic hooks components are connected to the original program code)
16. Application data description file (includes the project application data and the breakpoint application data)
17. Program version having software breakpoints

What is claimed is:

1. A method for adaptation of a function for controlling an operating sequence of a control unit, the function accessing at least one global variable of at least one program for control, the method comprising:

determining a breakpoint in the at least one program. wherein the determination is based on a comparison at least one of (1) between an address of the control unit and a register content loaded by a load instruction and (2) between the address of the control unit and a destination address of a store instruction;

assigning the global variable address information which is present in at least one memory device;

loading the memory device the address information of the global variable by at least one load instruction; and replacing the address information of the global variable with one of the store instruction and the load instruction.

2. The method as recited in claim 1, wherein the address information of the global variable is replaced by address information of a pointer variable.

3. The method as recited in claim 2, wherein the address information of the pointer variable is located in a reserved memory area.

4. The method as recited in claim 1, further comprising:

manipulating a memory instruction onto the global variable by replacing the memory instruction with a jump instruction.

5. The method as recited in claim 1, further comprising:

determining an initial address of the function from the address information.

6. The method as recited in claim 1, further comprising: replacing the function for controlling the operating sequence by replacing the address information with an additional function.

7. The method as recited in claim 4, further comprising: the function for controlling the operating sequence by replacing the memory instruction with the jump instruction is replaced with an additional function.

8. A device for adopting a function for controlling an operating sequence of a control unit, the function accessing at least one global variable of at least one program for control, the global variable being assigned address information, the device comprising:

a memory in which the address information is located;

a control device configured to:

determine a breakpoint in the at least one program, wherein the determination is based on a comparison at least one of (1) between an address of the control unit and a register content loaded by a load instruction and (2) between the address of the control unit and a destination address of a store instruction;

assign the global variable address information which is present in at least one memory device; and load the address information of the global variable out of the memory by at least one load instruction, the control device configured to replace the address information of the global variable with one of the store instruction and the load instruction.

9. The device as recited in claim 8, wherein the control device replaces the address information of the global variable by address information of a pointer variable.

10. A control unit for controlling an operating sequence, the control unit comprising:
- a device configured to adopt a function to controlling the operating sequence of a control unit, the function accessing at least one global variable of at least one program for control, the global variable being assigned address information, the device comprising:
- a memory in which the address information is located;
- a control device configured to:
  - determine a breakpoint in the at least one program, wherein the determination is based on a comparison at least one of (1) between an address of the control unit and a register content loaded by a load instruction and (2) between the address of the control unit and a destination address of a store instruction;
  - assign the global variable address information which is present in at least one memory device; and
  - load the address information of the global variable out of the memory by at least one load instruction, the control device configured to replace the address information of the global variable with one of the store instruction and the load instruction.

11. A storage medium storing program code executable by a computer, the program code, when executed by the computer causing the computer to perform the steps of:
- determining a breakpoint in the at least one program, wherein the determination is based on a comparison at least one of (1) between an address of the control unit and a register content loaded by a load instruction and (2) between the address of the control unit and a destination address of a store instruction;
- assigning the global variable address information which is present in at least one memory device;
- loading the address information of the global variable by at least one load instruction out of the memory device; and
- replacing the address information of the global variable with one of the store instruction and the load instruction.

12. A computer program having program code executable by a computer, the program code, when executed by the computer causing the computer to perform the steps of:
- determining a breakpoint in the at least one program, wherein the determination is based on a comparison at least one of (1) between an address of the control unit and a register content loaded by a load instruction and (2) between the address of the control unit and a destination address of a store instruction;
- assigning the global variable address information which is present in at least one memory device;
- loading the memory device the address information of the global variable by at least one load; and
- replacing the address information of the global variable with one of the store instruction and the load instruction.

13. A method for adapting a function to an operating sequence for controlling a control unit of a device, the function accessing at least one program that includes a breakpoint, the method comprising:
- determining the breakpoint in the at least one program, wherein the determination is based on a comparison at least one of (1) between an address of the control unit and a register content loaded by a load instruction and (2) between the address of the control unit and a destination address of a store instruction;
- modifying at least one of the load instruction and the store instruction based on at least one of a length of the load instruction, a length of the store instruction, a type of addressing, and a type of store instruction;
- creating a hook for the function based on a type of the breakpoint; and
- tying the hook for the function to the operating sequence.

14. The method of claim 13, wherein the load instruction loads an address of a global variable.

15. The method of claim 13, wherein the load instruction is replaced by an address of a pointer variable.

16. The method of claim 13, wherein the store instruction is a 32-bit store instruction.

17. The method of claim 16, wherein the 32-bit store instruction is replaced by an absolute jump instruction.

18. The method of claim 16, wherein the 32-bit store instruction is replaced by a function call.

19. The method of claim 16, wherein the 32-bit store instruction is replaced by a 32-bit jump instruction.

* * * * *

UNITED STATES PATENT AND TRADEMARK OFFICE
CERTIFICATE OF CORRECTION

PATENT NO. : 7,593,791 B2  Page 1 of 1
APPLICATION NO. : 10/578342
DATED : September 22, 2009
INVENTOR(S) : Martin Watzl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this

Twenty-eighth Day of September, 2010

David J. Kappos
*Director of the United States Patent and Trademark Office*